US010882615B2

(12) United States Patent
Bhat

(10) Patent No.: US 10,882,615 B2
(45) Date of Patent: Jan. 5, 2021

(54) MULTI-ROTOR AERIAL VEHICLE WITH SINGLE ARM FAILURE REDUNDANCY

(71) Applicant: IDEAFORGE TECHNOLOGY PVT. LTD., Maharashtra (IN)

(72) Inventor: Ashish Bhat, Navi Mumbai (IN)

(73) Assignee: IDEAFORGE TECHNOLOGY PVT. LTD., Maharashtra (IN)

( * ) Notice: Subject to any disclaimer, the term of this patent is extended or adjusted under 35 U.S.C. 154(b) by 288 days.

(21) Appl. No.: 16/060,163

(22) PCT Filed: Dec. 7, 2016

(86) PCT No.: PCT/IB2016/057399
§ 371 (c)(1),
(2) Date: Jun. 7, 2018

(87) PCT Pub. No.: WO2017/098412
PCT Pub. Date: Jun. 15, 2017

(65) Prior Publication Data
US 2018/0354623 A1 Dec. 13, 2018

(30) Foreign Application Priority Data
Dec. 9, 2015 (IN) .......................... 4642/MUM/2015

(51) Int. Cl.
*B64C 39/02* (2006.01)
*B64C 17/00* (2006.01)
*B64C 27/10* (2006.01)

(52) U.S. Cl.
CPC ............ *B64C 39/024* (2013.01); *B64C 17/00* (2013.01); *B64C 27/10* (2013.01);
(Continued)

(58) Field of Classification Search
CPC ............. B64C 17/00; B64C 2201/027; B64C 2201/108; B64C 2201/14; B64C 27/10; B64C 39/024
See application file for complete search history.

(56) References Cited

U.S. PATENT DOCUMENTS 3,002,712 A * 10/1961 Beckwith ................ B64C 27/20
244/17.23
8,052,081 B2 * 11/2011 Olm ...................... B64C 39/024
244/17.23
(Continued)

FOREIGN PATENT DOCUMENTS

WO 2012/035025 3/2012
WO 2014/198642 12/2014

OTHER PUBLICATIONS

International Search Report issued in International Application No. PCT/IB2016/057399, dated Mar. 22, 2017, 3 pages.

*Primary Examiner* — Medhat Badawi
(74) *Attorney, Agent, or Firm* — Hamre, Schumann, Mueller & Larson, P.C.

(57) ABSTRACT

The present disclosure provides a multi-rotor Aerial Vehicle comprising at least five arms. Pairs of coaxial contra rotating rotors/propellers are configured on each arm defining a polygon. In the event of failure of any one of the rotors/propellers, a control system incorporating an autopilot, shuts off corresponding contra rotating rotor/propeller of the pair to maintain yaw stability thereby rendering the corresponding arm non-functional; and adjusts throttles of the coaxial contra rotating rotors/propellers of remaining functional arms to maintain tilt and lift stability of the Aerial Vehicle.

6 Claims, 4 Drawing Sheets

(52) U.S. Cl.
CPC .. *B64C 2201/027* (2013.01); *B64C 2201/108* (2013.01); *B64C 2201/14* (2013.01)

(56) References Cited

U.S. PATENT DOCUMENTS

| | | | | |
|---|---|---|---|---|
| 8,128,033 B2* | 3/2012 | Raposo | ............... | A63H 23/00 244/171.2 |
| 8,453,962 B2* | 6/2013 | Shaw | ............... | B64C 39/024 244/17.23 |
| 8,646,720 B2* | 2/2014 | Shaw | ............... | B64C 29/0025 244/17.23 |
| 8,695,919 B2* | 4/2014 | Shachor | ............... | B64C 27/04 244/17.17 |
| 8,794,566 B2* | 8/2014 | Hutson | ............... | B64C 39/024 244/17.17 |
| 9,109,575 B2* | 8/2015 | Weddendorf | ............... | F03D 5/00 |
| 9,643,722 B1* | 5/2017 | Myslinski | ............... | G05D 1/0094 |
| 9,908,619 B1* | 3/2018 | Beckman | ............... | B64C 39/024 |
| 9,914,537 B2* | 3/2018 | Wu | ............... | B64D 47/08 |
| 10,124,888 B2* | 11/2018 | Pounds | ............... | A63H 27/00 |
| 2005/0061910 A1* | 3/2005 | Wobben | ............... | B64C 27/20 244/17.23 |
| 2006/0226281 A1* | 10/2006 | Walton | ............... | B64C 29/0033 244/17.23 |
| 2009/0250549 A1* | 10/2009 | Wiggerich | ............... | B64C 27/20 244/17.11 |
| 2011/0226892 A1* | 9/2011 | Crowther | ............... | B64C 15/02 244/17.23 |
| 2013/0020429 A1* | 1/2013 | Kroo | ............... | B64C 29/0025 244/6 |
| 2014/0222246 A1* | 8/2014 | Mohamadi | ............... | G01S 7/28 701/2 |
| 2014/0240498 A1* | 8/2014 | Ohtomo | ............... | G05D 1/0094 348/144 |
| 2015/0012154 A1* | 1/2015 | Senkel | ............... | B64C 25/34 701/4 |
| 2015/0175276 A1* | 6/2015 | Koster | ............... | B64F 1/00 244/114 R |
| 2015/0344136 A1* | 12/2015 | Dahlstrom | ............... | B64C 39/024 701/3 |
| 2016/0137304 A1* | 5/2016 | Phan | ............... | B64C 27/08 244/17.23 |
| 2016/0159471 A1* | 6/2016 | Chan | ............... | B64C 27/08 244/39 |
| 2016/0159472 A1* | 6/2016 | Chan | ............... | B64C 27/37 244/39 |
| 2016/0325834 A1* | 11/2016 | Foster | ............... | B64C 27/20 |
| 2017/0015417 A1* | 1/2017 | Bishop | ............... | B64C 27/82 |
| 2017/0247107 A1* | 8/2017 | Hauer | ............... | B64D 35/06 |
| 2017/0247110 A1* | 8/2017 | Chappell | ............... | B64C 27/52 |
| 2018/0194463 A1* | 7/2018 | Hasinski | ............... | B64C 39/028 |
| 2018/0312247 A1* | 11/2018 | Ichihara | ............... | B64C 27/08 |

* cited by examiner

MULTI-ROTOR AERIAL VEHICLE WITH SINGLE ARM FAILURE REDUNDANCY

TECHNICAL FIELD

The present disclosures relates to the field of aerial vehicles. More particularly, the present disclosures relates to a multi-rotor aerial vehicle that can maintain stable flight even if one of its arms and/or associated components fail for any reason.

BACKGROUND

Background description includes information that may be useful in understanding the present invention. It is not an admission that any of the information provided herein is prior art or relevant to the presently claimed invention, or that any publication specifically or implicitly referenced is prior art.

An unmanned aerial vehicle (also called UAV hereinafter) is a remotely piloted or self-piloted aircraft that can carry cameras, sensors, communications equipment, or other payloads, is capable of controlled, sustained, level flight, and is usually powered by an engine. A self-piloted UAV may fly autonomously based on pre-programmed flight plans.

UAV's are increasingly being used in various applications, where manned aerial vehicles are not appropriate or feasible. These applications may include military operations, such as surveillance, reconnaissance, target acquisition, data acquisition, communications relay, decoy, harassment, or supply flights. UAVs are also used for a growing number of civilian missions where a human observer would be at risk, such as fire fighting, natural disaster reconnaissance, police observation of civil disturbances or crime scenes, and scientific research. An example of the latter would be observation of weather formations or of a volcano. As miniaturization technology has improved, it is now possible to manufacture very small UAVs (sometimes referred to as micro-aerial vehicles, or MAVs).

UAVs are designed essentially in two forms: fixed-wing aircraft that operate like airplanes and multicopters having multiple rotors to provide lift forces and movements in different directions that can take off vertically and can hover like helicopters. The latter design is gaining rapid popularity amongst hobbyists as well as business users and is also sometimes referred to as a "drone".

Multi-rotor UAVs are provided with multiple rotors driven by respective motors that can be controlled in a differentiated manner so as to pilot the drone in altitude, direction and speed.

Generally, a joystick configuration is used to remotely pilot the multi-rotor UAV wherein throttle, pitch, roll and yaw are adjusted using stick controls. For example, to make the multi-rotor UAV move forward, the user tilts his device about itspitch axis (pitch being up and down movement of nose/head of the UAV along the horizontal axis from left to right of the drone), and to move the multi-rotor UAV aside to the right or to the left, he tilts said device with respect to itsroll axis (roll being tilting of the multi-rotor UAV towards left or right along a horizontal axis from nose to tail). The user has at his disposal other commands, in particular "climb/descent" (throttle control) and "right rotation/left rotation". These commands can be executed by the user using a joystick or a touch screen or touchpads.

Multi-rotor UAVs generally have a plurality of symmetrically distributed rotors, usually an even number equal to or greater than four. Quadcopters (multi-rotor UAVs with four arms, each with one rotor) have the advantage of being mechanically simpler than tricopters (multi-rotor UAVs with three arms, each with one rotor), with greater lift capacity and stability. However, conventional quadcopters cannot be reconfigured if one of the rotors fails and are completely destabilized due to their inherent dependence on the symmetry of the lift. Hexarotors and octarotors have increased reliability due to more number of actuators, however the cost and size consideration makes it desirable to reduce the number of arms to a minimum possible configuration.

While increasing the number of arms each with a rotor on a multi-rotor UAV can make it stable and capable of flight even if one rotor fails (such as for hexarotors and octarotors), the additional number of arms for the same payload increases the structural weight, increases inertia and results in decreased thrust margin, besides, of course, increasing the cost.

Hence there is a need in the art for a stable UAV arrangement for a multi-rotor UAV with minimum number of arms that would be able to function and maintain flight in the event of failure of one arm and/or associated components, while still maintaining compactness and size considerations.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE INVENTION

A general object of the present disclosure is to provide a reliable and cost effective multi-rotor rigid frame UAV.

An object of the present disclosure is to provide a multi-rotor UAV with inbuilt single arm failure redundancy so as to improve its reliability.

Another object of the present disclosure is to provide single arm failure redundancy in a multi-rotor UAV keeping number of arms/rotors to a minimum.

Yet another object of the present disclosure is to provide inbuilt single arm failure redundancy that takes care of lift, yaw, pitch and roll requirements of the multi-propeller UAV.

SUMMARY

Aspects of the present disclosure relate to multi rotor rigid frame Aerial vehicle (AV) such as an Unmanned Aerial Vehicle (UAV). The disclosure provides a system for providing single arm failure redundancy wherein in event of failure of one of its arm/rotor, the Aerial vehicle does not lose stability. In an aspect, the disclosure provides a configuration that requires minimum number of arms thus providing single arm failure redundancy at least cost.

In an aspect, the disclosure provides a 5-armed rigid frame UAV. The disclosed UAV can be based on 5-armed rigid frame configuration with each of the five arms incorporating a pair of coaxial contra rotating propellers. The centre of gravity (CG) of the UAV can be within a polygon defined by lines joining adjacent propellers in fixed configuration.

In an aspect, polygon defined by lines joining adjacent propellers can be a regular polygon with CG of UAV lying close to centre of the polygon. Therefore in event of failure of any one arm, the CG of UAV still lies well within the minimum support polygon formed by the remaining four arms that are still functioning thus providing capability of maintaining stability and yaw control even in the event of failure of one arm of UAV.

In an alternate embodiment, the polygon defined by lines joining adjacent propellers can be an irregular convex polygon of a configuration such that in event of failure of any one arm, the CG of UAV still lies well within the minimum support polygon formed by the remaining four arms that are still functioning thus providing capability of maintaining stability and yaw control even in the event of failure of one arm of UAV.

In an aspect, each pair of coaxial contra rotating propellers on five arms of the UAV can be run by a common motor or independent motors.

In an aspect, in event of failure of any one of the rotors/propellers, one of the functioning propellers that is rotating in direction opposite to the failed rotor/propeller can be shut off to maintain yaw stability. In a preferred embodiment, contra rotating propeller on the same arm is shut off to maintain the yaw stability.

In an aspect, the functioning rotors are throttled up or throttled down depending on their location in relation with the failed arm to maintain lift and tilt stability. The tilt stability is maintained by throttling up or throttling down the other rotors so as to move centre of lift to make it coincide with the CG. Lift stability is maintained by throttling up or throttling down the other rotors so that sum of lifting forces of the individual rotors/propellers is equal to weight of the UAV.

In an aspect the system of the disclosed UAV can comprise means to detect location of failed arm and throttle up or throttle down other rotors based on their relative vector position in relation with the failed arm as well as rotor that has been shut off to maintain yaw stability.

Various objects, features, aspects and advantages of the inventive subject matter will become more apparent from the following detailed description of preferred embodiments, along with the accompanying drawing figures in which like numerals represent like components

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

The term "yaw" as used herein refers to a side to side movement of the nose or rotation or heading of a multi-rotor UAV about its vertical axis passing through its centre of gravity The term "lift force" as used herein refers to various forces in an UAV enabling it to be lifted up.

The term "centre of lift" as used herein refers to the point on an UAV where sum total of all lift forces generated by all rotors can be represented as an aggregate force with its direction.

The term "throttle" as used herein refers to a mechanism to vary the lift forces of a UAV, generally by varying speed of its rotor assemblies that drives its propellers.

The term "moment of force" as used herein refers to the tendency of a force to rotate an object about an axis, fulcrum, or pivot.

The present disclosure relates to the field of aerial vehicles. More particularly, the present disclosures relates to a multi-rotor aerial vehicle that can operate even if one of its rotor assembly and/or associated components fail for any reason.

While the exemplary embodiments of the invention have been described hereunder with reference to a 5-armed rigid frame multi-rotor UAV, the scope of the invention applies to any aerial vehicle manned or unmanned that can use similar means and principles for achieving stability and/or altitude while in flight.

Figure 1:
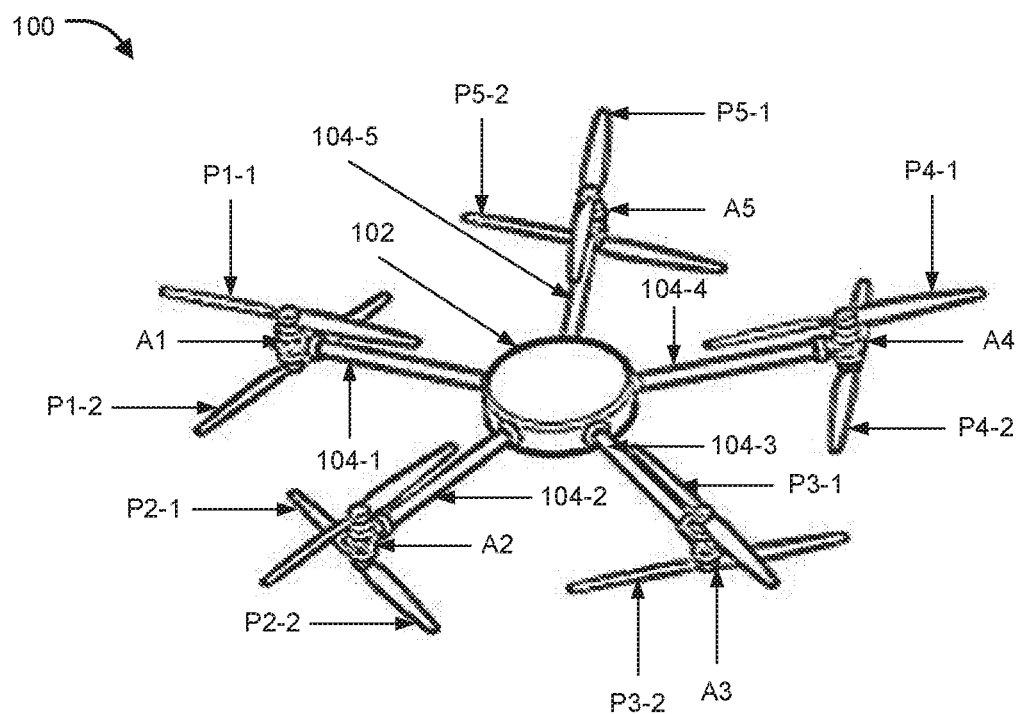
FIG. 1 illustrates an exemplary representation of a multi-rotor Unmanned Aerial Vehicle (UAV) in accordance with an embodiment of the present disclosure.

FIG. 1 illustrates an exemplary representation of a multi-rotor Unmanned Aerial Vehicle (UAV) in accordance with an embodiment of the present disclosure.

In an aspect, the UAV 100 can have rotor assemblies shown as A1, A2, A3, A4 and A5 that can be configured with motors.

In another aspect, each rotor assembly can be configured to carry a pair of coaxial propellers shown as P1-1 and P1-2 for rotor assembly A1, P2-1 and P2-2 for rotor assembly A2, P3-1 and P3-2 for rotor assembly A3, P4-1 and P4-2 for rotor assembly A4 and P5-1 and P5-2 for rotor assembly A5.

In an aspect, the rotor assemblies can be configured to be throttled up or down through their motors and, in consequence, increase or decrease the lift force provided by the corresponding propellers.

In another aspect, coaxial propellers can be configured to rotate in opposite directions thereby balancing each other's torque. In another aspect, the coaxial propellers can be configured to deliver required lift forces to the UAV. In an exemplary embodiment, to maintain a stable altitude in flight of UAV 100, all the coaxial propellers can be configured to deliver equal lift force, the sum of which can be equal to the sum of weight of UAV 100 and the weight to be carried (called "total weight" hereinafter) and can keep the sum of the moment of lift forces at the centre of gravity point of UAV 100 as zero so that UAV 100 does not tilt in any direction and does not become unstable in flight.

In an exemplary embodiment, the rotor assemblies can be connected in a 5-armed assembly to central hub 102 using any appropriate means as may be required to ensure a rigid and low/no vibration mounting of each co-axial propeller pair, such that all the coaxial propeller pairs are joined to central hub 102 in a pentagonal arrangement. In an exemplary embodiment such connection can be by means of five arms 104-1, 104-2, 104-3, 104-4 and 104-5 as shown in FIG. 1 thus providing a 5-armed rigid frame coaxial propeller configuration.

In an aspect, the propeller arrangement along a UAV arm may be on the same side or on its opposite sides.

Figure 4:
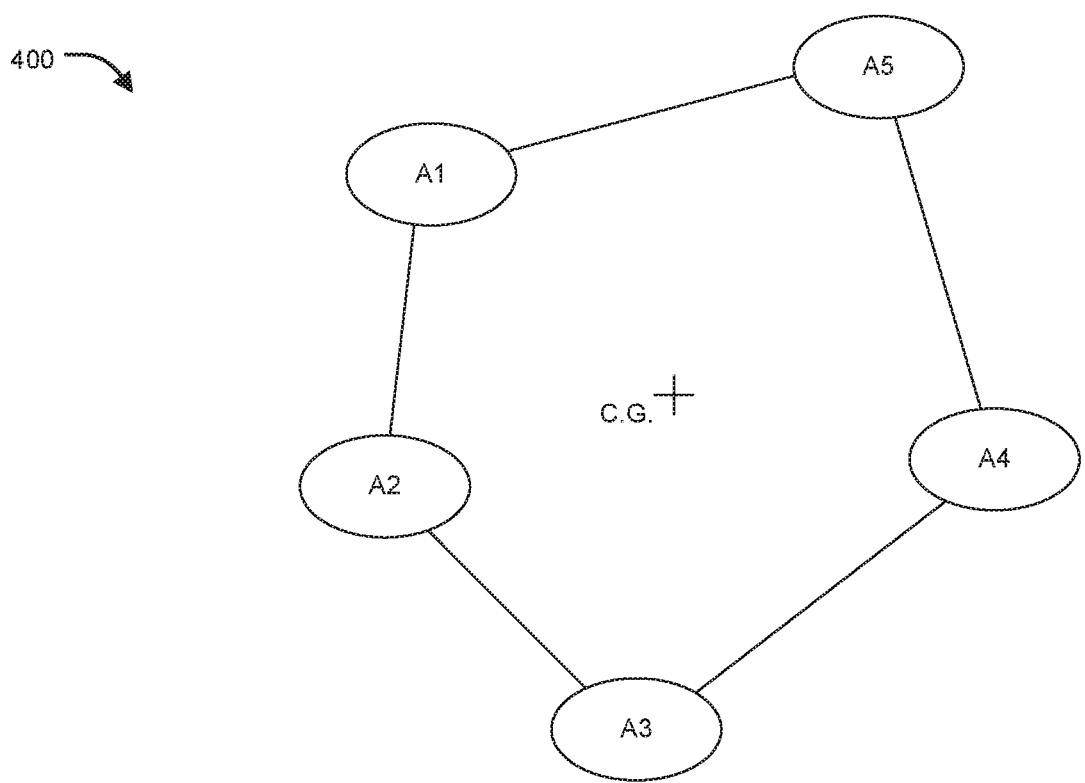
FIG. 4 illustrates an exemplary representation of an irregular convex configuration of the pairs of contra rotating coaxial rotors/propellers in accordance with an embodiment of the present disclosure.

It is to be appreciated that though embodiment shown in FIG. 1 (and also FIG. 2) have five rotors/propellers positioned in a regular polygon configuration, it is possible to have them in an irregular convex polygon of shape, such as shown in FIG. 4, such that in event of failure of any one arm, the CG of UAV still lies well within the minimum support polygon formed by the remaining four arms that are still functioning thus providing capability of maintaining stability and yaw control even in the event of failure of one arm of UAV.

In another aspect, in the event of failure for any reason of one propeller of a rotor assembly mounted on any arm, autopilot of UAV 100 can switch off motor(s) corresponding to that rotor assembly/arm so as to as well stop other coaxially placed propeller on that rotor, effectively disabling that arm of the UAV and serving to balance the yaw component.

Figure 2:
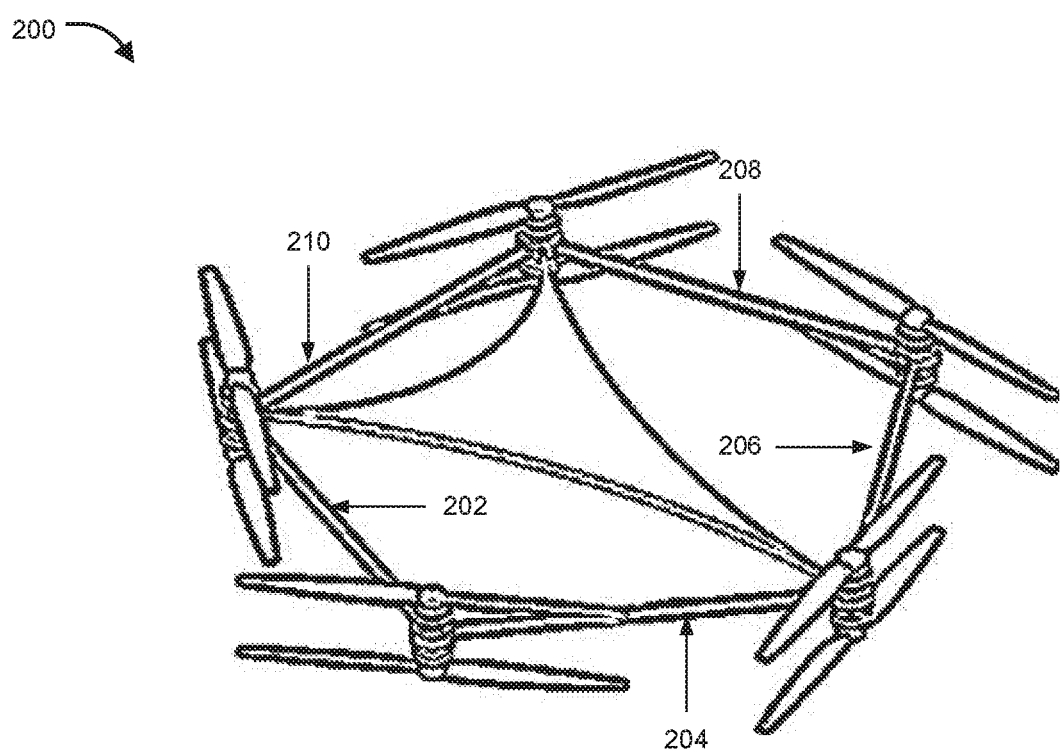
FIG. 2 illustrates another exemplary representation of a multi-rotor UAV, in accordance with an embodiment of the present disclosure

FIG. 2 illustrates another exemplary representation of a multi-rotor Unmanned Aerial Vehicle 200 in accordance with an embodiment of the present disclosure. As shown in FIG. 2, the UAV 200 can comprise five sides such as 202, 204, 206, 208 and 210 formed by joining vertices of a regular pentagon. Located at each vertex can be a rotor assembly comprising a pair of contra rotating coaxial propellers. Polygon thus formed can be supported by a suitable structure such as a triangular structure shown in FIG. 2 and, therefore, each of the rotor may not be connected to UAV body by a radial arm emanating from the UAV body. Any reference to a rotor arm in the disclosure shall include rotor of such configuration even though there may not be any arm per se.

In an aspect, the UAV 100 can further include a control system that incorporates an auto pilot configured to control throttle of the rotors based on operating condition of the UAV and its functional systems.

Figure 3:
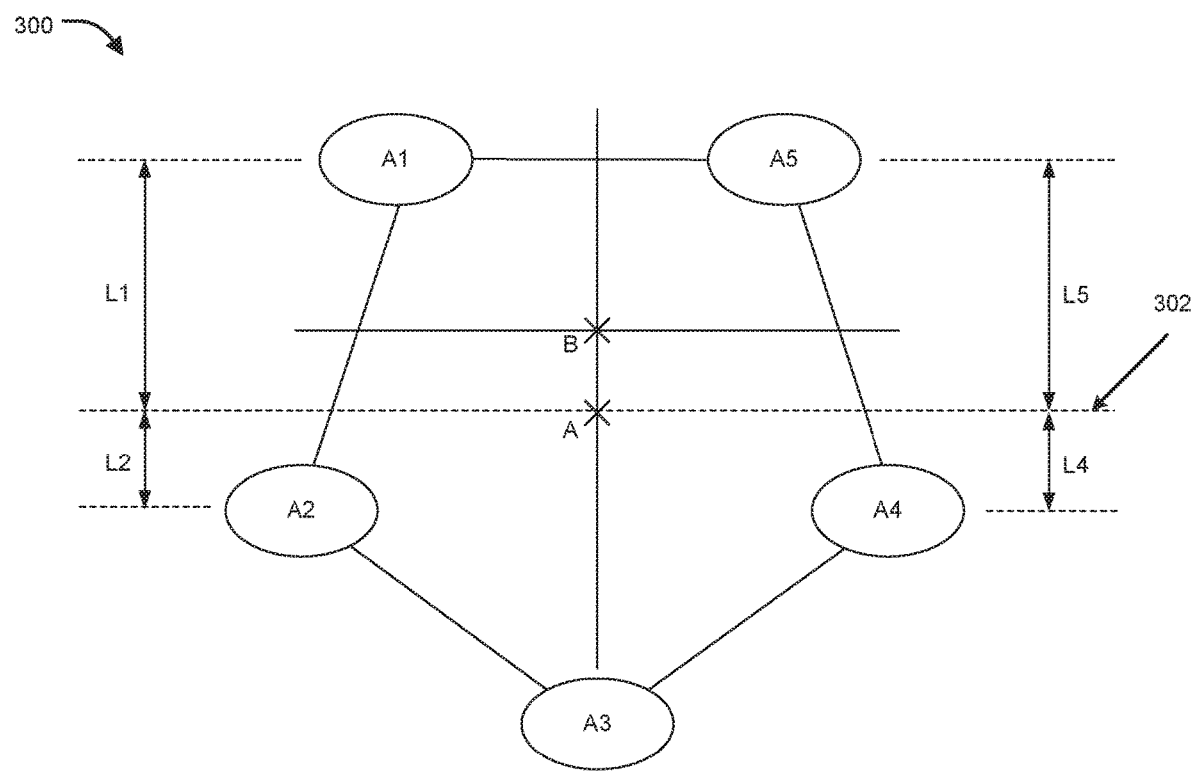
FIG. 3 illustrates an exemplary block diagram to explain single arm redundancy in a multi-rotor UAV in accordance with an embodiment of the present disclosure.

FIG. 3 illustrates an exemplary block diagram 300 to explain single arm redundancy in a multi-rotor UAV such as UAV 100 (or UAV 200 and any reference to UAV 100 hereinafter should be construed to include UAV 200). The lift forces created by combination of the rotors when rotating at equal speeds can be equal and accordingly (considering that mass is symmetrically distributed in the UAV) under that condition centre of lift of UAV 100/200 can coincide with its centre of gravity at point A as shown in FIG. 3. In alternate scenario, the rotors may be configured to run at different speeds so as to have centre of lift coinciding with the centre of gravity A of the UAV to provide it a stable condition.

During flight of UAV 100 any number of untoward accidents can occur that can lead to failure of any one of the rotor assemblies or its propellers or any one of UAV arm or any combination of these. Dust or small particulate matter can enter and damage the motors, excessive moisture can lead to corrosion of the motor shafts, motor driver can malfunction, or in another scenario, motor overheating can lead to deterioration of winding insulation and damage internal wiring of the system. Impact collisions with obstacles may cause mechanical damage to an arm of the UAV, UAV propeller blade may break off, or scratches/cracks on blades may grow over time and eventually lead to failure.

In an exemplary embodiment of the present disclosure, let us assume that one of the two contra rotating propellers of one arm, say P3-1 fails due to any of the failure scenarios stated above. In an aspect, the system of the present disclosure can have appropriately configured sensors on UAV 100 that can sense such failure and can direct its autopilot to shut off the corresponding rotor assembly, A3 in the present case.

In another aspect, once rotor assembly A3 has been shutoff and the lift forces provided by the remaining rotor assemblies remaining same as before, the centre of lift can shift to point B away from the centre of gravity point A (along line joining A3 to A in direction opposite to A3) as shown in FIG. 2. In such a situation, the sum of moment of forces on the centre of gravity point A will not be equal to zero and accordingly UAV 100 can start tilting about a horizontal axis perpendicular to line joining centre of A3 to centre of gravity point A such as line 302 (hereinafter referred to as axis of tilt or tilt axis 302), and consequently that can cause further reduction in lift forces and drifting aside of the UAV 100, finally causing UAV 100 to become unstable and crash. This can be avoided by adjusting lift forces of the remaining arms by throttle adjustment of the corresponding rotor assemblies as disclosed in the present disclosure.

In an aspect, the system of the present disclosure can be configured to provide such appropriate throttling signals to the relevant rotor assemblies so that the lift forces provided by the propellers of each arm can be increased or decreased from their initial values in order that sum of moment of lift forces on the centre of gravity point A can again be made zero and the UAV 100 remain stable.

In an aspect, two rotor assemblies (A1, A5) that are farther away from tilt axis 302 can be throttled down to decrease the lift force of their propellers in such a fashion that sum of moment of lift forces on centre of gravity point A can again be made zero and UAV 100 remain stable.

In another aspect, two rotor assembles (A2, and A4) that are nearer to tilt axis 302 can be throttled up to increase lift force of their propellers in such a fashion that sum of moment of lift forces on centre of gravity point A can again be made zero and UAV 100 remain stable.

In yet another aspect, each of the remaining rotor assemblies A1, A2, A5 and A4 can be individually throttled up and down to increase or decrease lift forces of their attached propellers in such a fashion that sum of moment of lift forces on the centre of gravity point A can again be made zero and the UAV 100 remain stable.

In an exemplary embodiment, once rotor assembly A3 is shut down, centre of lift of UAV 100 can shift to point B closer to rotor assemblies A1 and A5, and farther from rotor assemblies A2 and A4. As would be apparent, new lift centre B (when remaining rotor assemblies are working to provide equal lift i.e. before they are throttled up or down) would take a position such that all four working rotors are equidistance from a line 304 passing through the new lift centre B and parallel to the tilt axis 302. In an aspect, system of the present disclosure can readjust the throttles of remaining working rotor assemblies such as A1, A2, A4 and A5, so that sum of moment of lift forces on the centre of gravity point A can again be quickly made zero shifting the lift centre B back to coincide with the centre of gravity A and make the UAV 100 stable.

In an exemplary embodiment, the system of present disclosure can maintain sum of moment of lift forces (in their vector form) on the centre of gravity point A as zero by adjusting the throttles to the still rotor assemblies as explained below. The throttles to the rotor assemblies that are still working can be varied so that following scalar equations are satisfied:

$$(LfA1)*L1=(LfA2)*L2 \text{ and}$$

$$(LfA5)*L5=(LfA4)*L4$$

Where L1, L2, L4 and L5 are distances of the working rotor assemblies such as A1, A2, A4 and A5 respectively from axis of tilt 302; and LfA1, LfA2 etc. are lift forces provided by respective rotor assemblies such as A1, A2 etc.

In an aspect, distances of the working rotor assemblies such as L1, L2, L4 and L5 can be determined by system of the present disclosure taking into consideration location of the corresponding rotor assembly in relation with the failed rotor assembly.

In another aspect, total lift force on UAV 100 can be initially provided by summation of lift forces provided by each of the propellers provided on the rotor assemblies A1, A2, A3, A4 and A5 of UAV 100. After one rotor assembly has shut down the total lift force can reduce and so UAV 100 can lose altitude and/or become unstable, unless the lift forces of the remaining arms are adjusted.

In an embodiment, in such a case, lift forces of the remaining propellers can be increased by providing more throttle to their rotor assemblies so that the sum of lift forces with the remaining four propellers driven by their corresponding rotor assemblies once again becomes equal to the total weight of UAV 100 and so, UAV 100 can maintain altitude and equilibrium.

That is, in an aspect, while all rotor assemblies are functional, the system of the present disclosure can be configured so that the total lift provided by the rotor assemblies equals the total weight of UAV 100. This can be shown as:

$$\Sigma(LfA1)(LfA2(LfA3)(LfA4)(LfA5)=\text{Total Weight of UAV}$$

In another aspect, the system of the present disclosure can be configured such that once one rotor assembly, say A5 has been shut down, the total lift provided by the remaining rotor assemblies equals the total weight of UAV 100, while maintaining the centre of gravity of UAV 100 as before. This under the exemplary condition of failure of A3 can be shown as:

$$\Sigma(LfA1)(LfA2(LfA4)(LfA5)=\text{Total Weight of UAV}$$

The present disclosure provides for an invention that enables minimum number of arms to achieve redundancy in a static multi-rotor UAV configuration. Also, loss of lift force due to isolation of one arm out of five arms is only 20%, achieving higher lift force at redundancy compared to configurations which require two arms to be shut down upon single motor/propeller failure. The invention describes the minimum arm configuration required to operate a multi-rotor UAV in the event of one arm failure.

In an aspect, the functioning rotors are throttled up or throttled down depending on their location in relation with the failed arm to maintain lift and tilt stability. The tilt stability is maintained by throttling up or throttling down the other rotors so as to move centre of lift to make it coincide with the CG. Lift stability is maintained by throttling up or throttling down the other rotors so that sum of lifting forces of the individual rotors/propellers is equal to weight of the UAV.

In an embodiment, the UAV can have five arms each of the arms incorporating a pair of contra rotating propellers. The 5-armed rigid frame configuration using coaxial propellers can provide best redundancy with minimum number of arms and minimum penalty on throttle margin due to shutting down of a single arm due to propeller/motor/driver failure in that arm.

In an embodiment, the UAV can have a fixed pitch propeller mechanism or a variable pitch propeller system without any limitation.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed arrangements described above.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides a reliable and cost effective multi-rotor rigid frame UAV.

The present disclosure provides a multi-rotor UAV with inbuilt single arm failure redundancy so as to improve its reliability.

The present disclosure provides single arm failure redundancy in a multi-rotor UAV keeping number of arms/rotors to a minimum.

The present disclosure provides inbuilt single arm failure redundancy that takes care of lift, yaw, pitch and roll requirements of the multi-propeller UAV.

I claim:
1. A multi-rotor Aerial Vehicle comprising:
a frame having at least five arms;
pairs of contra rotating coaxial rotors/propellers configured on each arm of the frame; and
a control system incorporating an autopilot configured to control operation of the pairs of contra rotating coaxial rotors/propellers to maintain stability of the Aerial Vehicle;
wherein the pairs of contra rotating coaxial rotors/propellers are configured such that lines joining the adjacent contra rotating coaxial rotors/propellers define a polygon of a configuration such that in event of any one pair of the pairs of the contra rotating coaxial rotors/propellers becoming non-functional, centre of gravity of the Aerial vehicle still lies within a polygon formed by lines joining the adjacent pairs of contra rotating coaxial rotors/propellers that remain functional; and
wherein the control system is configured such that in event of failure of any one of the rotors/propellers of the pairs of contra rotating coaxial rotors/propellers, the auto pilot shuts off corresponding contra rotating rotor/propeller of the pair, rendering the corresponding pair of the contra rotating coaxial rotors/propellers non-functional, to maintain yaw stability.

2. The Aerial Vehicle of claim 1, wherein the pairs of contra rotating coaxial rotors/propellers are configured such that lines joining the adjacent contra rotating coaxial rotors/propellers define a regular polygon with centre of gravity of the Aerial vehicle substantially coinciding with centre of the polygon.

3. The Aerial Vehicle of claim 1, wherein the pairs of contra rotating coaxial rotors/propellers are configured such that lines joining the adjacent contra rotating coaxial rotors/propellers define an irregular convex polygon.

4. The Aerial Vehicle of claim 1, wherein in the event of failure of any one of the rotors/propellers, the autopilot also throttles up or throttles down functional pairs of contra rotating coaxial rotors/propellers depending on location of the functional pairs of contra rotating coaxial rotors/propellers in relation with the non-functional arm to maintain tilt and lift stability of the Aerial Vehicle.

5. The Aerial Vehicle of claim 4, wherein in the event of failure of any one of the rotors/propellers, the autopilot maintains lift stability by throttling up or throttling down the functional pairs of contra rotating coaxial rotors/propellers such that sum of lifting forces of the individual pairs of contra rotating coaxial rotors/propellers is equal to weight of the Aerial Vehicle.

6. The Aerial Vehicle of claim 4, wherein in the event of failure of any one of the rotors/propellers, autopilot maintains tilt stability by throttling up or throttling down the functional pairs of contra rotating coaxial rotors/propellers so as to move centre of lift to make the centre of lift coincide with centre of gravity of the Aerial Vehicle.

* * * * *